United States Patent [19]

Elena

[11] Patent Number: 5,310,281
[45] Date of Patent: May 10, 1994

[54] SUBSURFACE IRRIGATION SYSTEM

[76] Inventor: Alfonso P. Elena, 1701 Mt. Veeder Rd., Napa, Calif. 94539

[21] Appl. No.: 989,084

[22] Filed: Dec. 11, 1992

[51] Int. Cl.⁵ .............................................. E02B 13/00
[52] U.S. Cl. ...................................... 405/39; 405/36; 405/51
[58] Field of Search ............... 405/36, 37, 39, 40, 405/41, 43, 50, 51, 48; 47/48.5

[56] References Cited

U.S. PATENT DOCUMENTS

| | | |
|---|---|---|
| 656,887 | 8/1900 | Golibart . |
| 1,010,819 | 12/1911 | Thompson ........................ 405/39 X |
| 2,359,981 | 10/1944 | Fleming ................................. 405/39 |
| 3,546,884 | 12/1970 | Timpe ................................. 405/37 |
| 3,876,146 | 4/1975 | Pacheco . |
| 4,060,991 | 12/1977 | Reese . |
| 4,086,774 | 5/1978 | Duggins ............................... 405/39 |
| 4,117,685 | 10/1978 | Skaife . |
| 4,153,380 | 5/1979 | Hartman ............................... 405/39 |
| 4,156,396 | 5/1979 | Konucik ............................ 405/40 X |
| 4,350,296 | 9/1982 | Kuhlman et al. . |
| 4,928,427 | 5/1990 | Patterson . |
| 5,102,259 | 4/1992 | York et al. ........................ 405/41 X |

Primary Examiner—David H. Corbin
Attorney, Agent, or Firm—Kathleen A. Skinner

[57] ABSTRACT

A system for irrigating the roots of plants below the surface of the ground in which a narrow irrigation tube is connected at its upper end to a water distribution source. The irrigation tube extends below the surface of the ground from the water distribution source in generally vertical alignment with the stalk of the plant, and its lower end opens vertically downwardly below the roots of a plant, so that water may be discharged from the opening in the lower end in a downwardly direction. The soil in the planting site is broken up to a depth of at least five feet below ground surface.

19 Claims, 3 Drawing Sheets

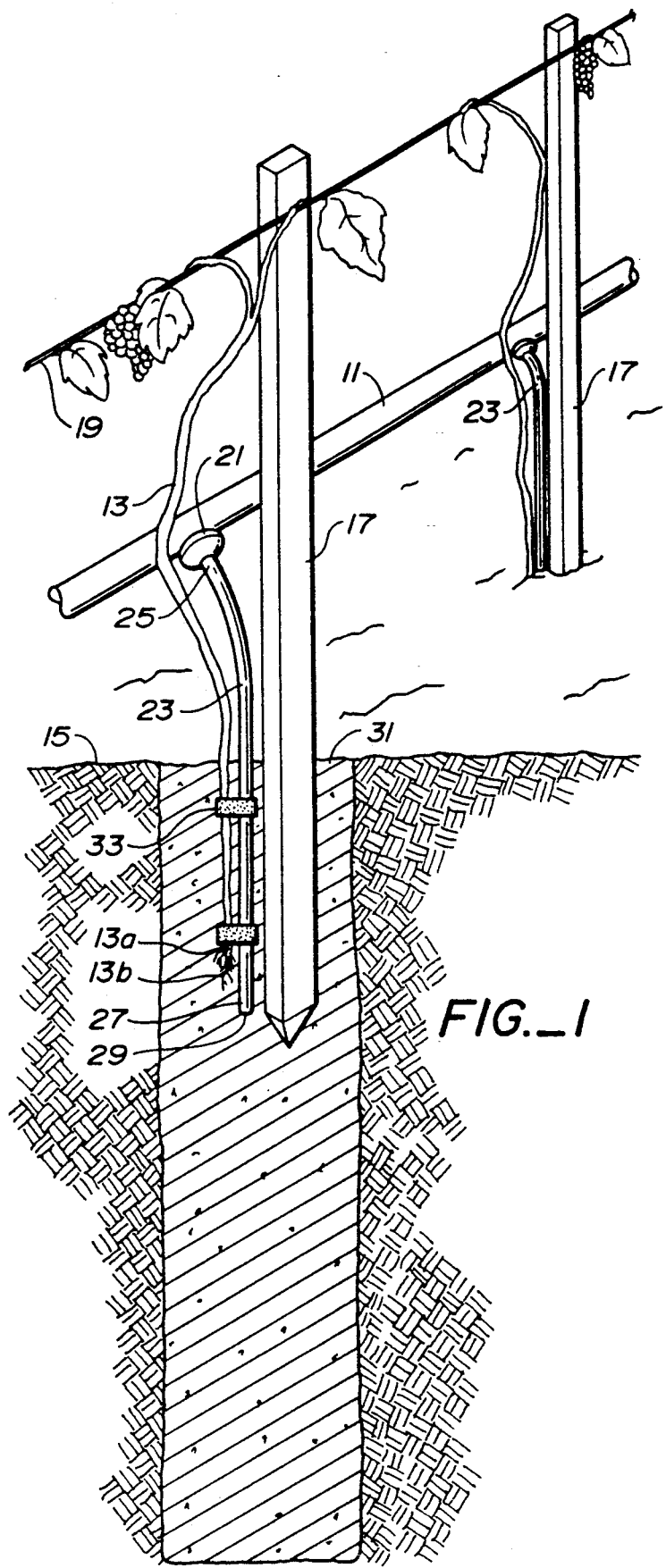
FIG._1

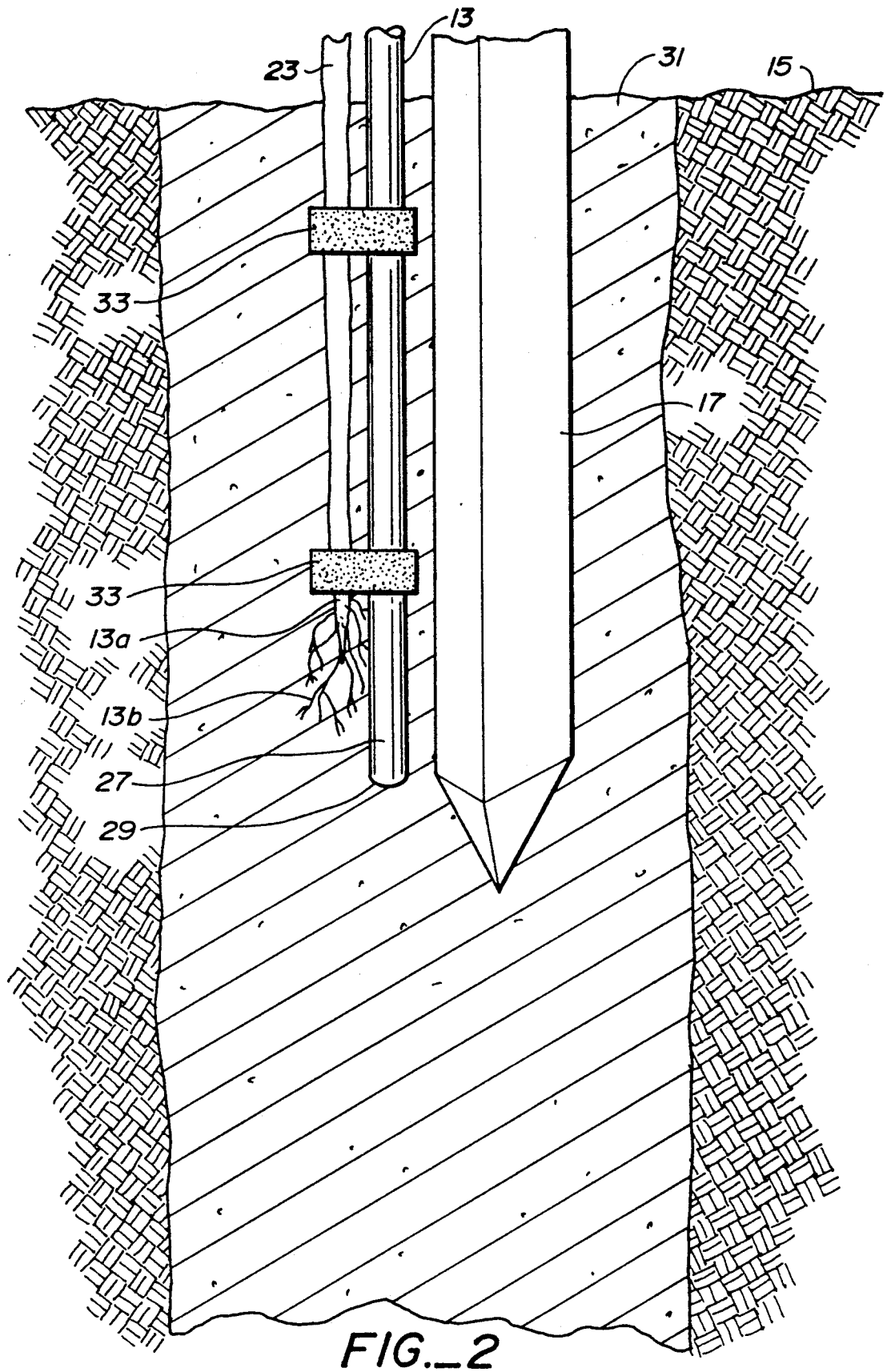
FIG._2

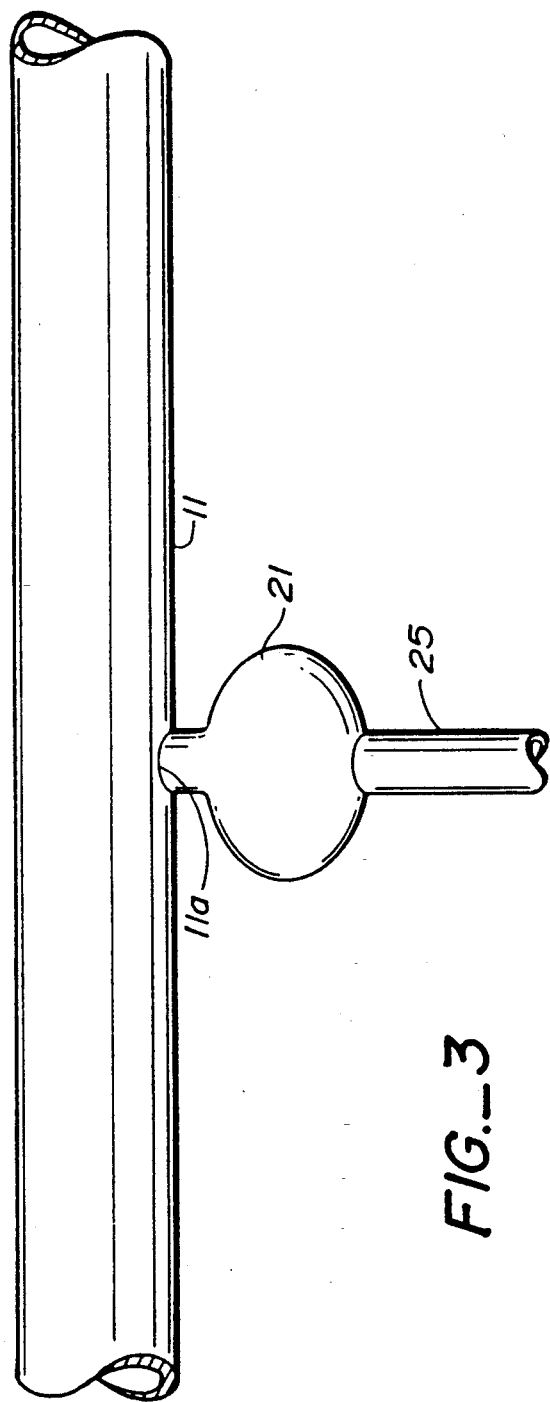

SUBSURFACE IRRIGATION SYSTEM

BACKGROUND OF THE INVENTION

1. Field of the Invention

The present invention relates to an irrigation system, and more particularly, to a system for supplying water to plants, and particularly grape plants, below the surface of the ground.

2. Description of the Background

In areas of the country which rely on irrigation during the peak of the growing season and in areas which experience periodic droughts, it is important to conserve water. The wine producing regions of California, which have an ideal climate for growing grapes for wine and have also achieved growing recognition as a source of premium wines, face these conditions. These regions have experienced a demand for land to accommodate both agricultural interests and residential needs for an increase in population. As a result of the demand for increased use of all lands in these areas, even hillside land, which has historically been difficult to irrigate, has been cultivated for vineyards. Thus, there has been an increased demand for water for agricultural and other uses at the same time that the supply of water has decreased and become less certain.

Drip irrigation methods are already widely used by grape growers and others raising high value crops. A typical drip irrigation system delivers water from a central water source to a particular field by underground plumbing systems or the like. The water is then provided to conduit or tubing which is run through the field along the rows of plants. This conduit releases the water at the sites of the plants through valves or emitters regularly spaced along the conduit. The purpose of such a system is to deliver the water as closely as possible to the plants themselves and avoid wasting it on surrounding soil. The conduit may be run on the ground near the plants, but in that case, it is more difficult to cultivate or remove weeds from the area around the plant without damaging the conduit. Weed reduction is important because the weeds compete with the vines for sun, water and nutrients. In many vineyards, the conduit is run along the rows of vines and is supported approximately 14 inches above the ground. This raised conduit allows easier cultivation around each vine, but these is less efficient use of the water since there is greater evaporation from the elevated emitters and the wind may change the direction of the water to miss the plant. The dripping water, over time, also creates channels in the soil, which leads to erosion. In some cases, thinner spaghetti tubing has been run from the emitter to the ground near the plant in a attempt to avoid evaporation. Discharging water at the base of the plant, however, does not ensure that the roots of the plants will receive the water in the direction of desired growth.

Another option has been to deliver the water directly to the roots by running an underground conduit along the rows of plants at root level or below. This kind of system, however, is very expensive to install and very difficult to repair, since leaking or faulty portions of the system would be difficult to identify or replace and any deep digging in the soil could damage the conduit.

A number of prior art systems have attempted to solve these problems U.S Pat. No. 3,876,146 illustrates a system with individual watering capabilities which is above ground and waters the plants on the surface. U.S. Pat. No. 656,887 illustrates a subsurface device for an individual plant which utilizes a cumbersome discharge nozzle. U.S. Pat. No. 4,060,991; 4,117,685; 4,350,296, and 4,928,427 illustrate other subsurface methods of irrigation in which water is delivered to the plant roots by components which run generally horizontally underground. However, there is still a need for a system which utilizes less water to produce acceptable growth, which can be simply assembled from conventional components, and which avoids evaporation, erosion and cultivation problems above the ground and difficult installation and maintenance problems below the surface of the ground.

The present invention provides an irrigation system which uses conventional conduit o feeder tubing for above ground distribution of the water through the fields and delivery to the plants without the maintenance difficulties of a below ground water distribution system, but which delivers water below the surface of the ground through deep vertical irrigation tubes to the root system of the individual plants. The system of the present invention loses no water to evaporation, reduces the water available to weeds, and avoids erosion of the soil. The invention also may utilize conventional distribution layouts, tubing and emitters. Most surprisingly, however, this invention not only solves the problems of the prior art, but it also causes the root systems of the plants to grow vertically downwardly, rather than laterally, to seek moisture and softer ground. This has led to an earlier period for establishment of the vines and to a stronger, better developed root system than with conventional methods,advantages achieved with much less water and plant maintenance than heretofore necessary.

SUMMARY OF THE INVENTION

The present invention provides a system for supplying moisture to the roots of plants in which feeder tubing connected to a water source is disposed above the surface of the ground. The feeder tubing has openings along its length with valve means proximate the openings to control the release of water. A plurality of irrigation tubes are connected at their upper ends to the valve means and extend in a downwardly direction adjacent a plant. Each irrigation tube, which is thinner in outer diameter than the feeder tubing, is vertically aligned below the surface of the ground with the stalk of the plant and has an opening in its lower end which opens downwardly and is at least slightly below the lower end of the plant stalk and below the roots of the plant for the discharge of water in a downwardly direction. Preferably, the irrigation tubes are narrow in outer diameter, flexible and impervious to the weather and the natural elements and extend at least 20 inches below the surface of the ground so that the roots of the plant will receive water released in a downwardly direction and will be trained to grow downwardly to seek the underground moisture level.

The invention includes a method for supplying water to the roots of plants which, in an initial installation, includes preparing a plant site by breaking up the soil to a depth of at least five feet below the ground surface, removing the soil to a depth greater than the preselected depth of the plant and placing the plant in a vertical position in the site. An irrigation tube and any desired support member are situated adjacent to the stalk of the plant. The irrigation tube extends along the depth of the stalk, connecting at its upper end to valve means disposed on feeder tubing and having a lower end with an opening extending downwardly from the lower end of the roots of the stalk. The opening is disposed to discharge water in a vertically downward direction. The feeder tubing is connected to a water source and water is discharged under pressure through the feeder tubing and valve means to the opening in the lower end of the irrigation tube to the roots of the plants in a vertically downward direction.

The system may also be installed for use with an established plant by breaking up the soil and preparing a tubular opening near the plant to a depth of at least four feet below the ground surface and inserting an irrigation tube in the tubular opening along the depth of the plant. The irrigation tube has a lower end with an opening for the discharge of water in a vertically downward direction. The irrigation tube is connected at its upper end to valve means on feeder tubing and the feeder tubing is connected to a water source. The water is released under pressure through the system to discharge water to the roots of the plant.

Thus, it is an object of the present invention to deliver water directly to the roots of the plants or slightly below the roots in a generally vertical direction to train the roots to grow downwardly. It is another object of the present invention to provide water so efficiently to the roots that less water is needed by the plant for enhanced growth. Another advantage of the current system is that it can be assembled from conventional irrigation components, it is not difficult to maintain and it does not interfere with weeding and other cultivation of the soil around the plant; in fact, since the roots of weeds are shallow and cannot reach the water discharged below ground, the system and method of this invention actually reduces the need for cultivation and weeding.

Other objects and advantages will become apparent when considered in conjunction with the accompanying drawings and description.

BRIEF DESCRIPTION OF THE DRAWINGS

FIG. 1 is a perspective view of the system of this invention showing the ground partially cut-away;

FIG. 2 is an enlarged elevational view of the invention; and

FIG. 3 is an enlarged elevational view of part of the system.

DETAILED DESCRIPTION OF THE INVENTION

The present invention is a system for supplying moisture to the roots of plants by conveying the water directly below the surface of the ground to the roots of the plants. The irrigation system of this invention includes a water distribution source having control means for the controlled release of water. The water distribution source typically includes feeder tubing 11 which is connected to a water source (not shown) for a plant 13 or a field of plants. The feeder tubing is disposed above the surface 15 of the ground proximate the plants to be watered and it has a plurality of openings 11a disposed along its length for the release of the water. Generally, when preparing a field, a plumbing system of underground pipes may be installed which will be used to deliver the water from a well, reservoir or other water supply to the field. Risers from these pipes are connected to feeder tubing 11 or water carrier hose. The feeder tubing is then run through the field adjacent to the plants 13 which are generally planted in rows five feet apart. Typically, in vineyards, the feeder tubing is plastic tubing which is relatively lightweight, somewhat flexible and approximately one-half inch (1.27 cm.) in outer diameter. The feeder tubing is placed on or above the surface of the ground 15. Although the feeder tubing may lie on the ground, it is preferably suspended a sufficient distance above the surface of the ground that the soil can be cultivated under it without risk of damaging the tubing; this will be at least 10 inches (25.4 cm.), and up to 14 inches (35.56 cm.) or so above the ground. Typically, the feeder tubing will be supported by regularly spaced support members 17 and wires 19 which are strung alongside the rows of vines so that the growing vines may be attached to them for training and pruning purposes.

The feeder tubing 11 has a plurality of openings 11a disposed along its length and valve means 21 disposed proximate the openings. The valve means may be conventional pressure-compensated emitters 21, such as Woodpecker-type emitters, secured to the feeder hose in a known manner. The size and type of emitters can be selected in a known manner, taking into consideration the water pressure available and the flow rate desired for the particular plants. The openings in the feeder tubing and the placement of the emitters generally correspond to the placement of the plants in a row; it is advantageous to have an emitter located near each plant. It has been found that the invention causes an advantageous growth rate if emitters are used which allow a release rate of ½ gallon to two gallons per hour with a water pressure of 5 to 38 p.s.i.

An irrigation tube 23 is connected to the valve means at its upper end 25 and extends downwardly adjacent to the plant to a point below the lower end of the stalk 13a of the plant. The irrigation tube has an opening 29 at its lower end 27 for the discharge of water in a vertically downward direction. The irrigation tube preferred for this invention, frequently referred to as spaghetti tubing, is narrow and between approximately one-fourth inch (6.35 mm.) and one-eighth inch (3.175 mm.) in outer diameter. It is made from a vinyl or other flexible plastic material which is generally impervious to the elements. Spaghetti tubing is currently used in some irrigation systems by extending it from the emitter to the surface of the ground near the plant in an attempt to limit the loss of water caused by evaporation between the emitter and the ground surface. The irrigation tube of this invention, however, extends from the valve means 21 on the feeder tubing 11 along the stalk of the plant 13 to the root zone 13b below the plant stalk. The irrigation tube extends along the depth of the plant in generally vertical alignment with the stalk of the plant below ground, preferably, for at least one to two inches longer or lower than the root ends of the plant stalk. When the system is in place, the water is discharged from the opening at the lower end of the irrigation tube at a point in the root zone below the lower end of the stalk, in a downwardly vertical direction. The roots 13b then grow downwardly to obtain moisture and are trained to grow in a vertical direction, rather than a lateral one. Surprisingly, it has been found that the roots do not grow into or plug up the opening of the irrigation tube of this invention.

The method of the present invention utilizes this irrigation system. For an initial installation of the system, a planting site for a grapevine is prepared by breaking up the soil 31 to a depth of at least five feet below the ground surface and, preferably, to a depth of six feet. The ground should be broken up sufficiently so that it is loose and the roots will be able to penetrate between the soil and rocks in a descending direction. It is efficient to prepare a row of planting sites at one time by breaking up the soil to create a channel of loosened soil between about six inches and twenty-four inches wide and at least five feet, and preferably six feet, deep. This site can be adequately loosened by using a D-8, D-9 or D-12 tractor with a seven foot ripper shank to break up the soil.

Sufficient loose soil 31 is then removed from the planting site to accommodate a plant 13, which is placed generally vertically in the planting site. In a conventional planting, the lower end of the stalk or stem 13 of a grapevine is 14 to 16 inches (35.56 cm. to 40.64 cm.) below the surface of the ground, the roots 13b of a new planting being two and one-half inches (6.35 cm.) long or so below the lower end of the stalk 13a. In this invention, it is preferred that the planting site be dug out or loosened an additional six inches (15.24 cm.) deeper than the lower end of the plant, to a depth of at least twenty inches (50.8 cm.) below the surface of the ground 15. The looser soil 31 below the roots of the plant stalk will enhance the downward growth of the roots in the direction of the water table. A support member 17 or grape stake may be inserted in the plant site to support the new planting in an upright position. The conventional grape stake extends several feet above ground and provides a training means for the grapevine and a means to anchor the feeder tubing.

An irrigation tube 23 is selected to have a length corresponding to a distance from the valve means 21 on the feeder tubing 11 along the length of the plant 13 to a point at least slightly below the lower end 13b of the roots of the plant so that the lower end 27 of the irrigation tube will be at least one to two inches below the root ends of the stalk. The irrigation tube is then placed in the planting site adjacent the stalk between the stalk 13 and the grape stake 17 and is preferably secured to the stalk at several sites along the length of the stalk by degradable securement means 33, such as masking tape or the like, which will deteriorate over time in the soil and not bind the stalk as it grows thicker. The irrigation tube will preferably be in vertical alignment with the plant stalk, descending from the ground surface and, at its lower end, the irrigation tube has an opening in a vertically downward direction from the roots of the plant.

The irrigation tube 23 is connected to the valve means 21 disposed on the feeder tubing 11 and the feeder tubing is connected to the risers or other piping leading to a water source. The water source preferably provides water to the field under pressure of approximately 23 to 28 psi, so that when a typical emitter is selected, it will provide one-half gallon to one gallon of water per hour to each plant being watered. At this rate, the roots are able to absorb the water efficiently and less water is necessary to obtain advantageous results. However, water pressure of between 5 psi and 38 psi can be used and emitters providing a flow of between 0.5 gallons to 2 gallons per hour can be accommodated.

The method of this invention is most effective for new plantings or replantings, but it can also benefit established plants. In that instance, the ground is prepared by breaking up the soil proximate the plant in the form of a tubular opening to a depth of at least five feet below the ground surface 15. A typical hand drill (not shown) can be used for this purpose. The irrigation tube 23 is then inserted in the tubular opening to a depth of at least twenty inches so that the opening 29 in its lower end 27 is disposed proximate the lower end of the stalk. The irrigation tube is thus connected to the valve means of the feeder tubing and the feeder tubing to a water source as heretofore described and water may be released under pressure through the system so that it will be discharged proximate the roots of the plant at the desired rate.

This procedure can also be used if the irrigation tube should need to be replaced for any reason. An advantage of the construction of this invention is that only the vertically aligned irrigation tube is placed below the ground. There is no risk of disturbing the horizontal members, as in other systems, which would require substantial excavation to remove or repair. If an irrigation tube should plug up which cannot be cleared by air pressure or by inserting a flexible wire down the tube, it can be replaced by easily detaching it from the emitter and, if necessary, be replaced by drilling a small tubular hole near the plant for insertion of another irrigation tube.

The beneficial effects of the irrigation system and method of this invention have been quite surprising as can be seen from the following example.

EXAMPLE I

A number of plants of 3309 root stalk were planted at the beginning of a growing season and irrigated according to a conventional method (referred to herein as the "Control" group). Another group of vines were planted according to the method of this invention in approximately the same area (referred to as the "Test" group).

For the Control group, the planting site was broken up to a depth of 2.5 feet (0.762 meters) and the lower end of the stalk reached approximately 16 inches (40.64 cm.) below the surface of the ground. Netaffin Woodpecker-type emitters capable of providing one-half gallon of water per hour were attached to openings in the feeder tubing in a known manner. The feeder tubing was supported on a trellis approximately fourteen inches above the surface of the ground and water pressure through the system and through the emitter was approximately 23 psi. Water was discharged about 14 inches above the soil near each plant.

For the Test group, the planting site was broken up to a depth of four to five feet and the lower end of the stalk reached approximately the same as above. In this case, however, the ground was dug out to a depth of twenty inches and irrigation tubes having an one-eighth inch (3.175 mm.) outer diameter were connected to Netaffin Woodpecker-type pressure-compensated emitters providing one-half gallon of water per hour, which emitters would accept the vinyl tubing. The irrigation tubes were secured to the root stalk by masking tape at points just below the surface of the ground and just above the end of the stalk. The irrigation tubes extended to approximately twenty inches below the surface of the ground, which for all the plants was below the lower end of the stalk and the root zone.

Approximately sixty days later, plants in the Test group had grown to twenty inches above the surface of the ground with twenty hours of watering (equivalent to ten gallons of water in total) per plant, compared to above-ground plant growth in the Control group of fourteen inches with fifty-four hours of watering (equivalent to twenty-seven gallons of water in total) per plant.

By five months after planting, a typical plant in the Test group had grown to nine feet with forty hours of watering (twenty gallons), compared to a typical plant in the control group, which had grown to five feet in the same time period with 180 hours of watering (ninety gallons).

Approximately thirteen months after planting, one of the test plants was dug up and its root system was evaluated. The roots had grown twenty-eight inches in thirteen months compared to typical root growth of twelve inches in a year expected from that variety. The primary roots of the Test group had also grown generally vertically, rather than laterally in search of water. Moreover, the root system for this root stock is usually poor, but in the Test plant which was analyzed, the roots were not only longer than expected, but much more filled out. Surprisingly, there was no deterioration or clogging of the irrigation tubes during the season of non-irrigation.

Thus, the plant growth for plants treated according to this invention have been greater than for conventional plantings and such growth has been accomplished with much less water than provided to conventional plantings. In addition, the plants irrigated according to this invention were more established and more mature at an earlier stage than is typically expected and the roots have been more voluminous, longer and more vertically oriented than typical plants. It is therefore expected that plants grown with the system of this invention will bear fruit at an earlier time and will be stronger and more stable plants and will become more independent of watering requirements as their roots reach the natural underground moisture level.

Thus, this invention provides a system for reducing the water required to irrigate plants by discharging the water below the roots, training the roots to grow straight downwardly and reducing the cultivation and maintenance requirements because of the reduced water available for the weeds. It ca be installed with relatively simple components.

While it can be seen that the above-described invention will achieve all the advantages and objects attributed to it and while it has been described in detail, the invention is not to be limited to such details except as necessitated by the appended claims.

I claim:

1. A system for irrigating the roots of plants below the surface of the ground, comprising
    a water distribution source;
    feeder tubing connected to said water distribution source and disposed above the surface of the ground proximate plants to be watered, said feeder tubing having a plurality of valve means disposed along its length for the controlled release of water; and
    a plurality of flexible irrigation tubes having an outer diameter narrower than the outer diameter of the feeder tubing and generally uniform over its length, each of said irrigation tubes having an upper end connected to said valve means and a lower end forming a vertically downward opening for the discharge of water proximate the roots of a plant, each of said irritation tubes extending for at least a portion of its length below the surface of the ground in a generally vertical alignment with the stalk of a plant to a depth below the lower end of the plant stalk proximate the roots of the plant whereby water may be discharged from the opening in the lower end in a downwardly direction.

2. The system of claim 1 wherein said plurality of valve means comprises a plurality of emitters disposed at intervals along said feeder tubing spaced to correspond to the plants to be watered and each of said irrigation tubes is connected at its upper end to an emitter and the other end of each tube extends vertically downward in close proximity to said plant stalk.

3. The system o claim 2, wherein the irrigation tubes have an outer diameter between one-half and one-fourth the outer diameter of the feeder tubing and the feeder tubing is supported at a height above the ground sufficient to permit cultivation of the soil proximate the plant.

4. The system of claim 2 wherein each irrigation tube extends at least 1 inch below the root ends of the plant stalk.

5. The system of claim 2, wherein the irrigation tubes are flexible and impervious and approximately one-eighth inch in outer diameter.

6. The system of claim 2 wherein each of said emitter and irrigation tubes attached thereto discharge under pressure between approximately one-half gallon and two gallons of water per hour to the plant.

7. The system of claim 2 wherein there are a plurality of flexible, impervious irrigation tubes and each of said irrigation tubes has an outer diameter of between one-fourth and one-eighth inch, and a lower end forming an opening for the discharge of water, each of said irrigation tubes being disposed in a descending direction from said emitter and extending below the ground in generally vertical alignment and close proximity with the stalk of a plant to a depth at the time of planting of approximately 2 inches below the lower ends of the roots of the plant stalk with the opening disposed to discharge water in a generally vertically downward direction.

8. The system of claim 7 wherein the feeder tubing is supported at least 6 inches above the surface of the ground and the irrigation tubes extend at least 20 inches below the surface of the ground.

9. The system of claim 7, wherein the emitter and irrigation tubes are adapted to release between one-half gallon and two gallons of water per hour under pressure through said irrigation tube.

10. A method of irrigating the roots of plants below the surface of the ground, comprising the steps of:
    a) preparing a planting site by breaking up the soil to a depth of at least five feet below the ground surface;
    b) selecting a plant to be planted;
    c) removing soil from the planting site to a depth greater than the preselected depth of the plant;
    d) situating the stalk of said plant generally vertically in the planting site to a predetermined depth;
    e) situating a flexible irrigation tube in the planting site adjacent the stalk of said plant, said irrigation tube having a generally uniform outer diameter, an upper end for connection to a water distribution source and a lower end forming an opening for the discharge of water in a vertically downward direction, a portion of the irrigation tube disposed below the surface of the ground in close proximity to the plant stalk, the lower end of said irrigation tube being disposed at least one inch below the lower ends of the roots of said stalk;

f) replacing the soil around said plant and said irrigation tube;

g) connecting said irrigation tube to a water distribution source, said water distribution source having control means for the release of water; and h) introducing water under pressure to the water distribution source and controlling the discharge of water to the roots of the plant at a desired rate.

11. The method of claim 10 wherein the soil is removed from the planting site to a depth of at least six inches greater than the predetermined depth of the plant.

12. The method of claim 10 in which a row of planting sites is prepared by breaking up the soil and creating a channel of loosened soil at least six inches wide and four feet deep to receive a plurality of plants.

13. The method of claim 10 in which said plant and said irrigation tube are supported by a support member and said irrigation tube is secured in a position in close proximity to the stalk of the plant below the surface of the ground by degradable securement means.

14. The method of claim 10 which the planting site is prepared by breaking up the soil sufficiently to allow leaching of water from the irrigation tube to a depth of six feet below the surface of the ground.

15. The method of claim 10 in which the irrigation tube is between approximately one-fourth and one-eighth inch in outer diameter.

16. The method of claim 15 wherein water is released to the roots of the plants at a rate between one-half gallon and two gallons per hour.

17. The method of claim 12 wherein the water distribution source comprises feeder tubing supported at a height above the ground sufficient to permit cultivation of the soil proximate the plant and an emitter disposed on said feeder tubing, said irrigation tube being connected to said emitter and extending approximately 20 inches below the surface of the ground.

18. A method of irrigating the roots of plants below the surface of the ground, comprising the steps of:

a) preparing a tubular opening in soil proximate a plant to be irrigated by breaking up the soil to a depth of at least five feet below the ground surface;

b) inserting an irrigation tube having a lower end with an opening for the discharge of water in a vertically downward direction into the tubular opening adjacent to said plant along the depth of said plant and toward the lower end of said plant, said irrigation tube having an upper end for connection to a water distribution source;

c) connecting said irrigation tube to said water distribution source, said water distribution source having control means for the release of water; and d) introducing water under pressure to the water distribution source and controlling the discharge of water to the roots of the plant at a desired rate.

19. The method of claim 18 wherein the irrigation tube has an diameter of between approximately one-fourth and one-eighth inch and extends for at least 20 inches below the surface of the ground.

* * * * *

UNITED STATES PATENT AND TRADEMARK OFFICE
CERTIFICATE OF CORRECTION

PATENT NO. : 5,310,281
DATED : May 10, 1994
INVENTOR(S) : ELENA, Alfonso P.

It is certified that error appears in the above—identified patent and that said Letters Patent is hereby corrected as shown below:

Col. 2. line 15, "o" should read --or--.

Col. 3. line 62, "11 a" should read --11a--.

Col. 7. line 41, "ca" should read --can--.

Col. 8:

Claim 3, line 11, "o" should read --of--.

Claim 6, line 23, "emitter" should read --emitters--.

Claim 9, line 44, "emitter" should read --emitters--.

Col. 9,
Claim 14, line 26, insert --in-- after "10".

Col. 10.
Claim 19, line 30, insert "outer" before the word "diameter".

Signed and Sealed this

Thirtieth Day of August, 1994

Attest:

BRUCE LEHMAN

*Attesting Officer*   *Commissioner of Patents and Trademarks*